United States Patent [19]

Graff et al.

[11] 3,857,963

[45] Dec. 31, 1974

[54] METHOD FOR FORMING CENTER-FILLED CHEWING GUM

[75] Inventors: Allan H. Graff, New York, N.Y.; Richard A. Reggio, East Rutherford, N.J.

[73] Assignee: Warner-Lambert Company, Morris Plains, N.J.

[22] Filed: Nov. 8, 1973

[21] Appl. No.: 414,050

Related U.S. Application Data

[62] Division of Ser. No. 271,086, July 12, 1972, Pat. No. 3,806,290.

[52] U.S. Cl. .................................. 426/3, 426/5
[51] Int. Cl. .............................................. A23g 3/30
[58] Field of Search ............................. 426/3, 5, 4

[56] References Cited
UNITED STATES PATENTS

| | | | |
|---|---|---|---|
| 1,771,982 | 7/1930 | Mustin | 426/5 |
| 2,256,190 | 9/1941 | Bowman | 426/5 |
| 3,071,476 | 1/1963 | Werft et al. | 426/3 |

FOREIGN PATENTS OR APPLICATIONS

| | | | |
|---|---|---|---|
| 969,464 | 9/1964 | Great Britain | 426/3 |

*Primary Examiner*—Samih N. Zaharna
*Assistant Examiner*—J. M. Hunter
*Attorney, Agent, or Firm*—James F. Powers, Jr.; Albert H. Graddis

[57] ABSTRACT

The specific disclosure provides for forming center-filled chewing gum by extruding a hollow-centered rope of chewing gum through an orifice having a pair of concentric conduits extending therethrough. A center-fill is fed through the inner conduit to the hollow center of the rope downstream of the orifice, and air is vented from the hollow center upstream through a space between the inner and outer conduits. The center-filled rope of chewing gum is passed to a sizing unit having a plurality of pairs of rollers for progressively decreasing a cross-sectional dimension of the gum rope. The plurality of pairs of rollers includes at least one vertical pair of rollers having vertically aligned axes of rotation and overlapping lower flange portions. Ramp means are provided for guiding the gum rope above the roller flange portions upon entry of the gum rope between the vertical pair of rollers.

13 Claims, 3 Drawing Figures

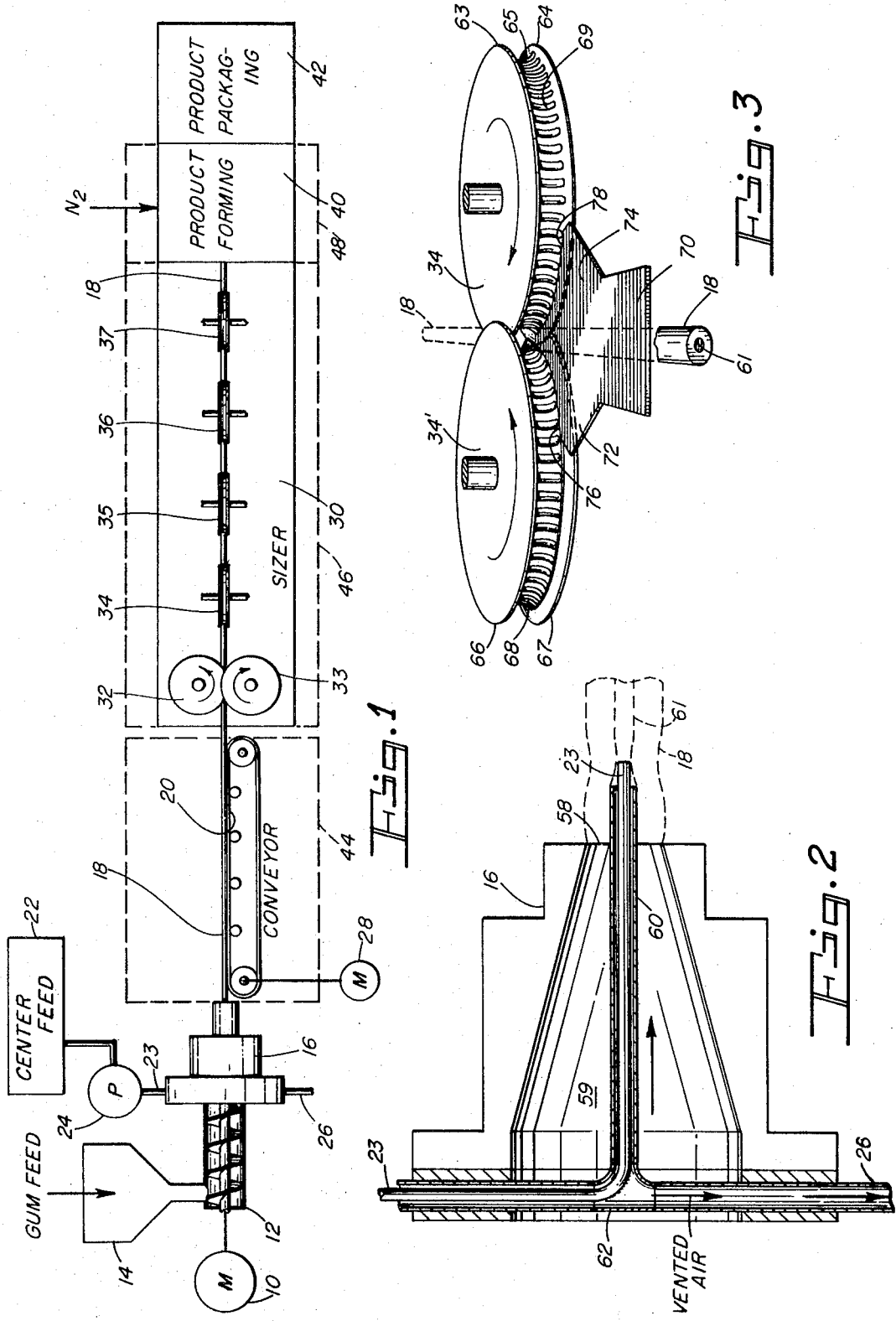

3,857,963

METHOD FOR FORMING CENTER-FILLED CHEWING GUM

CROSS-REFERENCE TO RELATED APPLICATION

This application is a division of U.S. Pat. application Ser. No. 271,086, filed July 12, 1972, now U.S. Pat. No. 3,806,290.

BACKGROUND OF THE INVENTION

The present invention relates to methods for forming chewing gums. More particularly, the present invention relates to a method for filling the centers of chewing gum.

Center-filled chewing gum is known in the art. For example, U.S. Pat. No. 810,210 discloses filling the center of chewing gum with a jelly or a fruit syrup. One of the problems involved in the manufacture of center-filled chewing gum is in continuously processing the chewing gum in sufficient quantity to be economically feasible. Any slight production difficulties which may be involved in processing individual chewing gum pieces will adversely affect production techniques which are dictated primarily by industry economy.

SUMMARY OF THE INVENTION

The present invention provides a method for continuously forming center-filled chewing gum.

In accordance with the present invention, there is provided a method of forming center-filled chewing gum comprising the steps of extruding a rope of hollow center chewing gum through an orifice, feeding a stream of center-fill through the orifice to the hollow center downstream of the orifice, and venting air from the hollow center prior to entry of the center-fill stream therein.

BRIEF DESCRIPTION OF THE DRAWINGS

FIG. 1 is a diagrammatic view of center-fill chewing gum apparatus used in a specific embodiment of the present invention;

FIG. 2 is a cross-sectional view of an extrusion head depicting an embodiment of one aspect of the present invention; and FIG. 3 is a perspective view of a pair of sizer rollers depicting an embodiment of another aspect of the present invention.

DESCRIPTION OF SPECIFIC EMBODIMENTS

FIG. 1 shows a diagrammatic representation of a system for forming center-filled chewing gum. With reference to FIG. 1, a variable speed motor 10 drives a gum extruder 12. Gum is fed to the extruded 12 by means of a hopper 14. The gum is extruded through an extruder head 16 in an elongated rope form 18 onto a conveyor belt 20.

The center of the gum rope 18 is continuously filled at the outlet of the extruder head 16 with, for example, a jam or a liquid sweetener. The center-fill is moved from a center feed reservoir 22 through a conduit 23 to the extruder head 16 by means of a pump 24. An air vent 26 is provided on the extruder head 16 for venting air from the point at the outlet of the extruder head 16 at which the center-fill is fed into the center of the gum rope 18. The apparatus and method for feeding the center-fill to the gum rope 18 will be described hereinafter.

The conveyor 20 is driven by a motor 28 to feed the gum rope 18 to a gum rope sizer unit 30. The sizer unit 30 has a plurality of pairs of rollers for reducing the cross-sectional area of the gum rope 18 to a predetermined dimension. In the specific embodiment shown in FIG. 1, the first pair of rollers 32, 33 have their longitudinal axes arranged in parallel horizontal planes. In this embodiment, the remaining pairs of rollers 34–37 have vertically aligned longitudinal axes. In FIG. 1, only one roller of each remaining pair of rollers 34 – 37 is shown. The other roller of each of the remaining pairs of rollers 34 – 37 is hidden by the roller shown.

The rope from the sizer unit 30 is fed to a product forming unit 40 wherein the rope 18 is formed into predetermined shapes of gum pieces. The gum pieces from the product forming unit 40 are then passed to a product wrapping and packaging station 42 for packaging in a desired manner.

The gum extruder motor 10 and the center-fill feed pump 24 may each be variable speed elements such that the speed of the gum extruder 12 and the flow rate of center-fill in the conduit 23 can be adjusted to provide a predetermined amount of center-fill in the gum product. The conveyor motor 28 may also be a variable speed motor to permit correlation of the conveyor 20 speed and the gum rope 18 extrusion rate to prevent gum rope pulling or build-up at the outlet of the extruder head 16.

The conveyor unit 20 is enclosed in a cooling unit 44 which may be an air-conditioned fed encasement having a transparent portion so that the rope 18 can be observed. A temperature of 60° F. suitably case hardened the rope 18 within the cooling unit 44 to prevent the rope 18 from sticking to the conveyor unit 20.

The sizer unit 30 can be rope sizer type 165A manufactured by Hamac-Hansella Maschinen GmbH of Dusseldorf, Germany, and having an outlet at Piscataway, N.J. The type 165A rope sizer has five pairs of rollers diagrammatically shown in FIG. 1. Th rollers are power driven to pull the gum rope 18 therebetween and progressively reduce a cross-sectional dimension or area of the gum rope 18.

The functions of the product forming station can be carried out by a universal forming machine type 160A, known as Uniplast, also manufactured by Hamac-Hansella Maschinen GmbH. The type 160A Uniplast has a plurality of dies which are sequentially indexed into position to form a plurality of individual gum pieces from the gum rope 18 fed thereto. The sizer unit 30 and the product forming station 40 are encased in cooling units 46, 48 to cool the gum therein and thus prevent the gum from sticking. The cooling units 46, 48 can suitably be Freon freezers. A temperature of between about 15° F. and about 20° F. within a sizer unit 30 consisting of the type 165A rope sizer was found to prevent adverse sticking of the gum rope 18 to components of the sizer unit 30.

Liquid nitrogen can be sprayed onto the surfaces of the dies (not shown) of the product forming station 40 to further cool the dies prior to compression of the gum to minimize the possibility of the gum sticking to the surfaces of the dies. A temperature in the range of about 5° F. to about 20° F. within the product forming station 40 embodied as the type 160A Uniplast with liquid nitrogen sprayed onto the die surfaces thereof was found to prevent adverse sticking of gum to the component parts of the product forming station 40.

The product packaging station 42 can have a substation for receiving the gum pieces from the product forming unit 40 and for permitting the gum to set. A suitable substation atmosphere for setting of the gum was found to be 70° F. and 30 percent relative humidity. From the gum-setting substation, the gum is then passed to other wrapping and packaging substations within the product packaging station.

The gum extruder 12 can suitably be Model No. 6483 manufactured by Bonnot Company, Kent, Ohio. The Model No. 6483 extruder has one feed screw. However, models having more than one screw can be used.

A 15-foot long conveyor unit 20 was found to be suitable for temporary accumulation of excess gum rope 18 whenever the extrusion rate of the extruder 12 exceeded the pulling rate of the rollers 32 – 37 in the sizer unit 30. However, the speed of extrusion of the gum rope 18 from the extruder 12 can be matched with the speed of the gum rope 18 passage through the sizer unit 30 to eliminate any need for the conveyor unit 20 and its associated cooling unit 44.

With reference to FIG. 2, the extruder head 16 has a bore 59 of decreasing diameter to an orifice 58. A vent conduit 60 extends inwardly through the orifice 58 and is joined by a T-connection to the vent conduit 26 at the rear end of the extruder head 16. The vent conduit 26 is opened at each end thereof to the atmosphere. The center-fill conduit 23 extends downwardly through the upper part of the vent conduit 26, and is bent at the T-connection for extension through the vent conduit 60 outwardly of the orifice 58. Gum is forced through the bore 59 in the direction of the arrow by pressure of the extruder 12. The gum is extruded through the orifice 58 about the vent conduit 60 to form the gum rope 18 having a hollow center or bore 61.

The center-fill conduit 23 protrudes a slight distance outwardly from the vent conduit 60 for feeding a center-fill into the hollow center 61 under pressure of the feed pump 24 (FIG. 1). The center-fill conduit 23 protrudes from the vent conduit 60 to avoid the possibility of center-fill entering a space between the concentrically arranged center-fill and vent conduits 23, 60.

The vent conduit 60 also protrudes a slight distance outwardly from the orifice 58. The protrusion of the vent tube 60 is provided to preclude the possibility of gum entering the space between the center-fill and vent conduits 23, 60. Specifically, the vent tube 60 should be positioned relative to the orifice 58 such that gum will not enter the vent conduit 60 under the compressive pressure of the extruder head 16. As the gum is forced through the extruder head 16, gaseous substances which in the embodiment described consist of air are compressed in bubble form. As the gum rope 18 is extruded from the orifice 58, the compressed air tends to expand to deform the outer perimeter or contour of the gum rope. Further, such compressed air adversely affects the consistency of the center-fill in the hollow center 61. The vent conduit 60 minimizes these adverse effects of compressed air be venting air from the hollow center 61 upstream through the space between the center-fill and vent conduits 23, 60. The vented air from the hollow center 61 passes upwardly through the space between the concentrically arranged center-fill conduit 23 and the upper portion of the vent conduit 6, and downwardly through the lower portion of the vent conduit 26 to atmosphere.

The diameter of the orifice 58 can suitably be 1.5 inch. The vent conduit 60 can have a ½ inch inner diameter and a ⅝ inch outer diameter, and the center-fill conduit 23 can suitably have a ¼ inch inner diameter and a ⅜ inch outer diameter.

The vent conduit 60 can suitably protrude from the orifice 58 by about 0.5 inch to about 1.0 inch. Similarly, the center-fill conduit 23 can protrude about 0.5 inch to about 1.0 inch outwardly from the vent conduit 60.

FIG. 3 shows the first pair of vertical rollers 34, 34' with the gum rope 18 depicted as moving from the horizontal rollers 32, 33 into the view of FIG. 3. The rollers 34, 34' are powered to rotate in counter-directions as shown by the arrows thereon to pull the gum rope 18 therebetween. Each of the rollers 34, 34' has a plurality of recesses 69 formed in the periphery of vertical center portions 65, 68. Each of the center portions 65, 68 vertically extend between a pair of radial flanges 63, 64; 66, 67. The flanges 63, 64 of the roller 34 are fitted between the flanges 66, 67 of the roller 34' such that the cross-sectional area of the rope 18 as it leaves the pair of rollers 34, 34' is defined by the cross-sectional area in the space between the vertical roller portions 65, 68 and the flanges 63, 64.

A ramp 70 having wing portions 72, 74 guides the gum rope 18 over the overlapping lower flanges 64, 67 as the gum rope 18 enters the space between the two rollers 34, 34'. The wings 72, 74 are suitably curved at 76, 78. By guiding the gum rope 18 over the overlapping flanges 64, 67, the ramp 70 avoids the problem of the gum rope 18 sticking to the flanges 64, 67 and thus having torsional stresses applied thereto prior to the gum rope 18 passing between the rollers 34, 34'. Such torsional stresses could act to twist the gum rope 18 to an extent that the hollow center 61 shifts off-center and possibly lead to the center-fill breaking through the gum rope 18 during any one of the processing steps.

The remaining pairs of vertical rollers 35 – 37 function in the same manner as described with reference to the rollers 34, 34' and have a ramp for guiding the gum rope 18 between each pair of rollers. The only significant difference between each pair of vertical rollers 34 – 37 is that the space therebetween progressively decreases in cross-sectional area to suitably dimension the gum rope 18 for the product forming unit 40.

It is also contemplated that a ramp can be provided between adjacent pairs of vertical rollers such that the gum rope 18 is guided above the overlapping flanges as it exits the space between the respective pairs of vertical rollers and is thereafter guided over the overlapping lower flanges of the subsequent pair of rollers as it enters the space therebetween.

The aspects of the present invention can be practiced with known gum formulations such as those described in U.S. Pat. No. 3,303,796. Further, the center-fill can be of any desired pumpable substance such as a jam or a liquid. A suitable liquid formulation can consist of sucrose, glucose and water with known dyes and flavorings.

What is claimed is:
1. A method of forming center-filled chewing gum comprising the steps of:
extruding a rope of chewing gum having a hollow center through an orifice,
feeding a stream of center-fill through said orifice to said hollow center downstream of said orifice, and venting air from said hollow center prior to entry of said center-fill stream therein.

2. The method of claim 1 wherein said air is vented from said hollow center in a passageway concentrically arranged about said center-fill stream and extending upstream through said orifice.

3. The method of claim 1 wherein said center-fill is a jam.

4. The method of claim 1 wherein said center-fill is a liquid.

5. The method of claim 1 further comprising progressively decreasing a cross-sectional dimension of said gum rope to a predetermined dimension by sizer means including a plurality of pairs of rollers.

6. The method of claim 5 further comprising cooling said sizer means to prevent said gum rope from sticking thereto.

7. The method of claim 6 wherein said sizer means is cooled to less than 20°F.

8. The method of claim 6 wherein said sizer means is cooled to between about 15°F. and about 20°F.

9. The method of claim 5 further comprising forming said gum rope into a plurality of gum product pieces with a plurality of dies.

10. The method of claim 9 further comprising cooling said dies to prevent said gum rope and said plurality of gum product pieces from sticking thereto.

11. The method of claim 10 wherein said dies are cooled to less than 20°F.

12. The method of claim 10 wherein said dies are cooled to between about 5° F. and about 20° F.

13. The method of claim 12 wherein liquid nitrogen is applied to the surfaces of said dies.

* * * * *